US010536471B1

(12) United States Patent
Derbeko et al.

(10) Patent No.: US 10,536,471 B1
(45) Date of Patent: Jan. 14, 2020

(54) MALWARE DETECTION IN VIRTUAL MACHINES

(71) Applicant: EMC IP Holding Company LLC, Hopkinton, MA (US)

(72) Inventors: Philip Derbeko, Modiin (IL); Shai Kappel, Bnaya (IL); Uriya Stern, Lehavim (IL); Maya Bakshi, Beer Sheva (IL); Yaniv Harel, Neve-Monosson (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 139 days.

(21) Appl. No.: 15/086,979

(22) Filed: Mar. 31, 2016

(51) Int. Cl.
*G06F 12/14* (2006.01)
*H04L 29/06* (2006.01)
*G06F 9/455* (2018.01)

(52) U.S. Cl.
CPC ...... *H04L 63/1425* (2013.01); *G06F 9/45558* (2013.01); *H04L 63/145* (2013.01); *H04L 63/1416* (2013.01); *G06F 2009/45587* (2013.01)

(58) Field of Classification Search
CPC . G06F 2009/45587; G06F 2009/45595; G06F 21/552; G06F 21/56; G06F 21/566; G06F 21/567; G06F 2201/815; G06F 9/45533; G06F 2009/45591; G06F 2201/84; H04L 63/1416; H04L 63/20; H04L 63/1425
USPC .................................................. 726/1, 22–24
See application file for complete search history.

(56) References Cited

U.S. PATENT DOCUMENTS 6,775,780 B1 * 8/2004 Muttik .................... G06F 21/53 713/165
8,056,134 B1 * 11/2011 Ogilvie ................. G06F 21/566 713/187
8,151,263 B1 * 4/2012 Venkitachalam ....... G06F 9/485 711/162
8,726,083 B1 * 5/2014 van der Goot ..... G06F 11/1438 714/15
8,904,525 B1 * 12/2014 Hodgman ............ G06F 21/562 726/22
8,949,829 B1 * 2/2015 Xing ................... G06F 11/1469 718/1
9,230,100 B2 * 1/2016 Wang ...................... G06F 21/53
9,400,886 B1 * 7/2016 Beloussov ............ G06F 21/566
9,690,936 B1 * 6/2017 Malik ................... G06F 21/562
9,740,577 B1 * 8/2017 Chakraborty ....... G06F 11/1469
10,048,890 B1 * 8/2018 Samad .................. G06F 3/0619
(Continued)

FOREIGN PATENT DOCUMENTS

CN 105068856 A * 11/2015
CN 105068856 A * 11/2015
EP 3241140 A1 * 11/2017 ............ G06F 21/53

*Primary Examiner* — Jason K Gee
*Assistant Examiner* — Lizbeth Torres-Diaz
(74) *Attorney, Agent, or Firm* — Ryan, Mason & Lewis, LLP

(57) ABSTRACT

A system, computer program product, and computer-executable method of detecting malware in a virtual machine (VM), the computer-executable method comprising periodically creating snapshots of the VM, analyzing each of the snapshots in comparison to one or more previous snapshots to determine whether anomalies exist, and based on a threshold amount of anomalies detected, scanning the VM to determine whether malware is detected.

20 Claims, 10 Drawing Sheets

(56) References Cited

U.S. PATENT DOCUMENTS

| | | | | |
|---|---|---|---|---|
| 2007/0240222 | A1* | 10/2007 | Tuvell | G06F 21/56 726/24 |
| 2009/0158432 | A1* | 6/2009 | Zheng | G06F 21/562 726/24 |
| 2016/0321455 | A1* | 11/2016 | Deng | G06F 21/577 |
| 2017/0034198 | A1* | 2/2017 | Powers | G06F 21/552 |
| 2019/0235973 | A1* | 8/2019 | Brewer | G06F 11/1469 |

* cited by examiner

MALWARE DETECTION IN VIRTUAL MACHINES

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method of detecting malware in a virtual machine (VM), the computer-executable method comprising periodically creating snapshots of the VM, analyzing each of the snapshots in comparison to one or more previous snapshots to determine whether anomalies exist, and based on a threshold amount of anomalies detected, scanning the VM to determine whether malware is detected.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
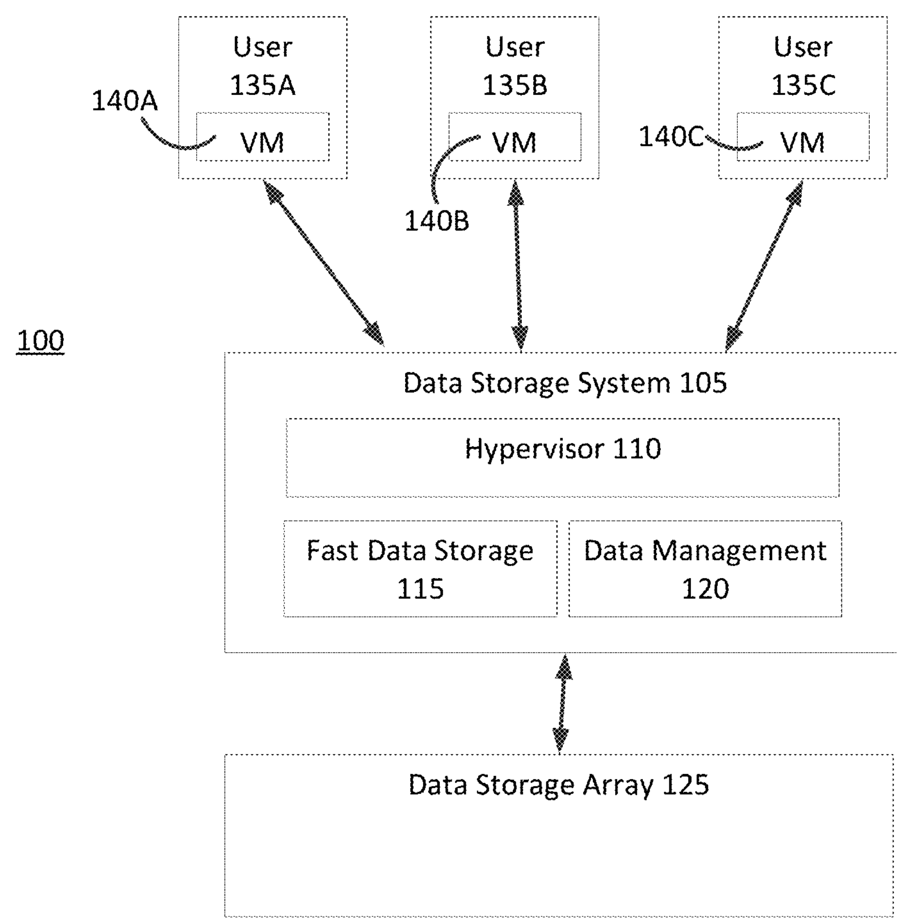
FIG. 1 is a simplified illustration of a data storage system providing virtualization technology resources to users, in accordance with an embodiment of the present disclosure.

Typically, recent advances in virtualization technologies have sped up their integration into daily life for both business and personal use. Generally, virtualization technologies enable users to have power computing resources available whenever and wherever they want. Traditionally, malicious code and/or malware have been isolated to a single user's account and/or computer. However, recently, as virtualization technologies are starting to become ubiquitous, the mobility that virtualization technologies provide also increases an amount of vulnerability to malware. Traditionally, data storage and service providers have limited tools and/or resources available when detecting malware. Conventionally, improvements to malware detection would be beneficial to the data storage industry.

Traditionally, detecting and/or tracking malware is very difficult as malware is constantly changing. Typically, current malware defense mechanisms are based on signature recognitions that are often one step behind the latest versions of malware. Conventionally, agents running on VMS often are useless as malware has evolved to determine whether detection agents exist and bypass agents as they are running their scans. Generally, detection agents running on a VM also become problematic as they affect the VM and are effected by VM. Specifically, agents inside a protected machine expands the attack surface. Agents inside a protected machine affects the performance of the VM it is attempting to protect though the scanning and checking of all incoming and outgoing bytes, whether it is by network, storage, or web-browsing. Generally, deployment of agents on VMs is also problematic as the number of VMs to be protected grows exponentially over time, which makes installation and upgrades in these environments extremely challenging.

In many embodiments, the current disclosure may enable detection of malware within data centers. In various embodiments, the current disclosure may enable a user and/or administrator to detect malware within virtual machines (VMs) provided from data storage systems and/or data centers. In certain embodiments, the current disclosure may facilitate detection of malware within data centers and/or data storage systems through performing automatic, periodic and/or pro-active forensic analysis of data center resources. In most embodiments, the current disclosure may enable agentless detection of malware within data centers and/or data storage systems. In some embodiments, data centers and/or data storage systems may provide virtualization services such as, but not limited to, virtual machines (VMs).

In various embodiments, the current disclosure may enable detection of malware in virtualization technology, such as virtual machines in private, hybrid, and/or public clouds. In certain embodiments, the current disclosure may enable analysis and/or detection of malware without exposing other computers, VMs, detection tools and/or the mechanism itself to the potentially malware infected virtual machines. In some embodiments, the current disclosure may enable detection of previously unknown malware variants, which may include malware having no persistent mechanism, such as, but not limited to running only in volatile memory. In most embodiments, the current disclosure may enable a user and/or admin to "look" at a set of resources from outside the set of resources. In various embodiments, the current disclosure may enable a user and/or administrator to identify suspicious changes to resources without creating more exposure to the possibly malicious code and/or malware.

In many embodiments, the current disclosure may enable a user and/or administrator to protect their data centers through a number of stages. In various embodiments, a number of stages may include a preparation stage, a deployment stage, and a learning stage. In most embodiments, a preparation stage may enable a user and/or administrator to conduct analysis and prepare detection tools for a specified set of virtualization technologies for specific types of malware and/or malicious code. In various embodiments, during a preparation stage of malware detection for virtualization technologies, a data storage system may take a large number of snapshots on virtual machines, both infected and not infected with malware. Each of the large number of snapshots may be analyzed and differences between each consecutive pair of snapshots may be fed into a malware detection module.

In certain embodiments, a malware detection module may be enabled to utilize a learning algorithm which may be able to detect differences between infected and non-infected virtualization technologies. In most embodiments, a malware detection module may create a model of changes detected within snapshots of virtualization technologies. The changes may include benign changes and malicious changes within virtualization technologies. In most embodiments, virtualization technologies may include, but are not limited to, a hypervisor, virtual machines, and/or hardware and software facilitating use of hypervisors and virtual machines. As the malware detection module receives more examples of malware vs non-malware changes, the malware detection module may be enabled to associated probabilities of malware infection based on one or more changes made to virtualization technologies. In many embodiments, a malware detection module may be enabled to create a dataset of snapshots of different virtual machines, both infected and not infected. In various embodiments, a malware detection module may be enabled to analyze the snapshots to determine differences between the infected and non-infected VMs.

In many embodiments, a deployment stage may enable a user and/or administrator to deploy a malware detection module on a private, hybrid, public cloud, and/or data storage system. Upon deployment, a malware detection module may be enabled to take periodic snapshots of Virtual Machines (VMs) and may be enabled to analyze the snapshots in comparison to the malware detection module's internal malware models. Snapshots of VMs may be reduced to deltas or considered as-is and fed into the malware detection module's model. In most embodiments, if changes within a snapshot (or its delta from a previous snapshot) appear to be benign, then the malware detection module may continue to another VM. In some embodiments, if a snapshot (or its delta from a previous snapshot) appears to be suspicious, a security operator may be alerted and the snapshot may be further processed. In certain embodiments, suspicious snapshots may be analyzed using forensic analysis methods. In various embodiments, a malware detection module may determine if a snapshot is suspicious based on whether a threshold may be met. In some embodiments, a threshold may be met if a user and/or administrator set number of errors and/or malware indicators are found within one or more snapshots. In other embodiments, one or more errors and/or malware indicators of a set of snapshots of a single VM may exceed a threshold.

In most embodiments, an administrator and/or user may utilize the malware detection module to further investigate and/or catalog differences to determine whether information relating to the suspicious snapshot should be included in the malware detection module model of malware behavior. In many embodiments, a malware detection module may be enabled to analyze different aspects of a VM through analyzing a snapshot of the VM. In various embodiments, a malware detection module may search for malware code in memory, unrecognized processes, unexpected open network ports, unexpected network connections, API hooks that may have been hi-jacked, as well as other suspicious behavior.

In various embodiments, analyzing snapshots of VMs, instead of the VMs while running, may enable isolation of a detecting module from the malware itself. Further, in some embodiments, analyzing snapshots may enable a detecting module to analyze VM memory, which may be valuable as malware has to run in memory and thus, it has to leave traces and clues in memory. In these embodiments, since a snapshot is taken outside of a VM, malware may not be able to eliminate evidence and/or bypass the check. Thus, a detecting module may be enabled to identify highly advanced or seemingly unseen malware does eliminate evidence or attempts to bypass the check. In many embodiments, as a snapshot may be taken without stopping a virtual machine, a detecting module may be enabled to analyze a VM without causing an impact to the VM. Once a snapshot is taken, a detecting module may be enabled to scan the snapshot, network, and/or memory without impacting the VM or anything the VM may be doing. In most embodiments, a detecting module may include a malware detecting module. In most embodiments, in a learning stage, a malware detection module may incorporate results back into its own models to adapt to new malware and/or variations of circumstances in which malware was detected.

In various embodiments, a malware detection module may use a two phased approach to detecting malware and/or malicious code on a VM, including a scan and a deep scan. In certain embodiments, during a scan, a malware detection module may periodically create snapshots of a VM being monitored. These snapshots may be analyzed for suspicious activity, such as, but not limited to, atypical memory usage, extraneous port usage, superfluous network connections, and/or other unusual activity given the implementation on a VM. In other embodiments, a malware detection module may compare a recent snapshot with one or more previously taken snapshot of a VM to determine whether malware has infected the VM. In some embodiments, a malware detection module may analyze one or more snapshots to determine whether a VM has a threshold amount of suspicious activity to proceed to using a deep scan to analyze the VM.

In most embodiments, during a deep scan, a malware detection module compares each suspicious snapshot with malware profiles. In various embodiments, each malware profile may contain typical behavior, locations, and/or forensic evidence associated with each type of malware.

Refer to the example embodiment of FIG. 1. FIG. 1 is a simplified illustration of a data storage system providing virtualization technology resources to users, in accordance with an embodiment of the present disclosure. As shown, system 100 includes data storage system 105 and data storage array 125. Data storage system 105 includes hypervisor 110, fast data storage 115, and data management module 120. Data storage system 105 is in communication with data storage array 125. Data storage system 105 is enabled to provide virtual machines (VMs) (140A-C, 140 generally) to users (135A-C, 135 generally) using hypervisor 110. Users 135 are in communication with data storage system 105 to gain access to hypervisor 100, which provides each of Users 135 with a virtual machine. Data storage system 105 provides data storage for VMs 140 using fast data storage 115 and data storage array 125.

Figure 2:
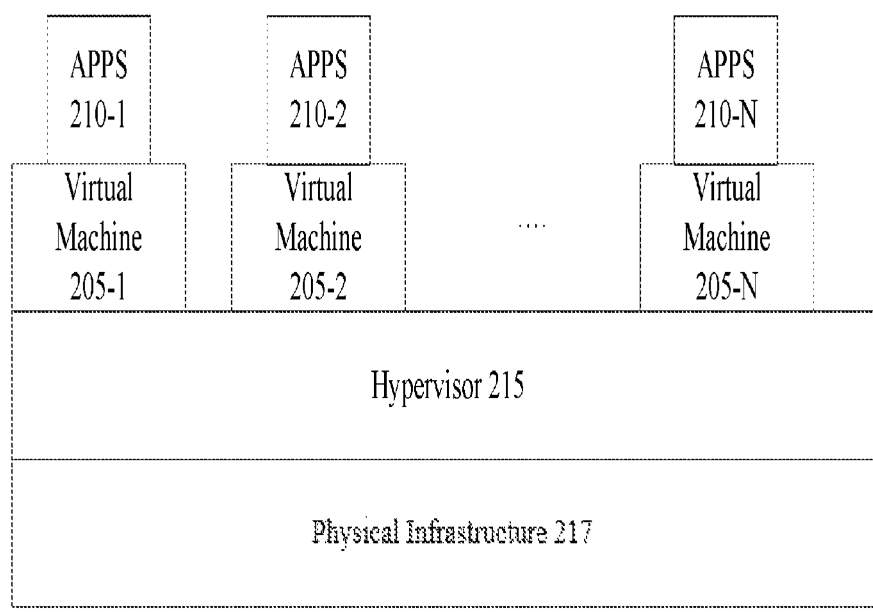
FIG. 2 is a simplified illustration of a hypervisor interacting with physical infrastructure and virtual machines, in accordance with an embodiment of the present disclosure.

Refer to the example embodiment of FIG. 2. FIG. 2 is a simplified illustration of a hypervisor interacting with physical infrastructure and virtual machines, in accordance with an embodiment of the present disclosure. As shown, hypervisor 215 runs on physical infrastructure 217. In many embodiments, physical infrastructure may include a data storage system that may be enabled to run one or more hypervisors and may be enabled to communicate with one or more data storage arrays. In various embodiments, data storage systems may include one or more flash cache drives to facilitate quicker access of frequently used data also stored on one or more data storage arrays. In this embodiment, hypervisor 215 is enabled to run virtual machines (205-1, 205-2, 205-N, 205 generally). As shown, virtual machine 205-1 is running application 210-1, virtual machine 205-2 is running application 210-2, and virtual machine 205-N is running application 210-N. In many embodiments, each virtual machine may be enabled to run one or more applications.

Figure 3A:
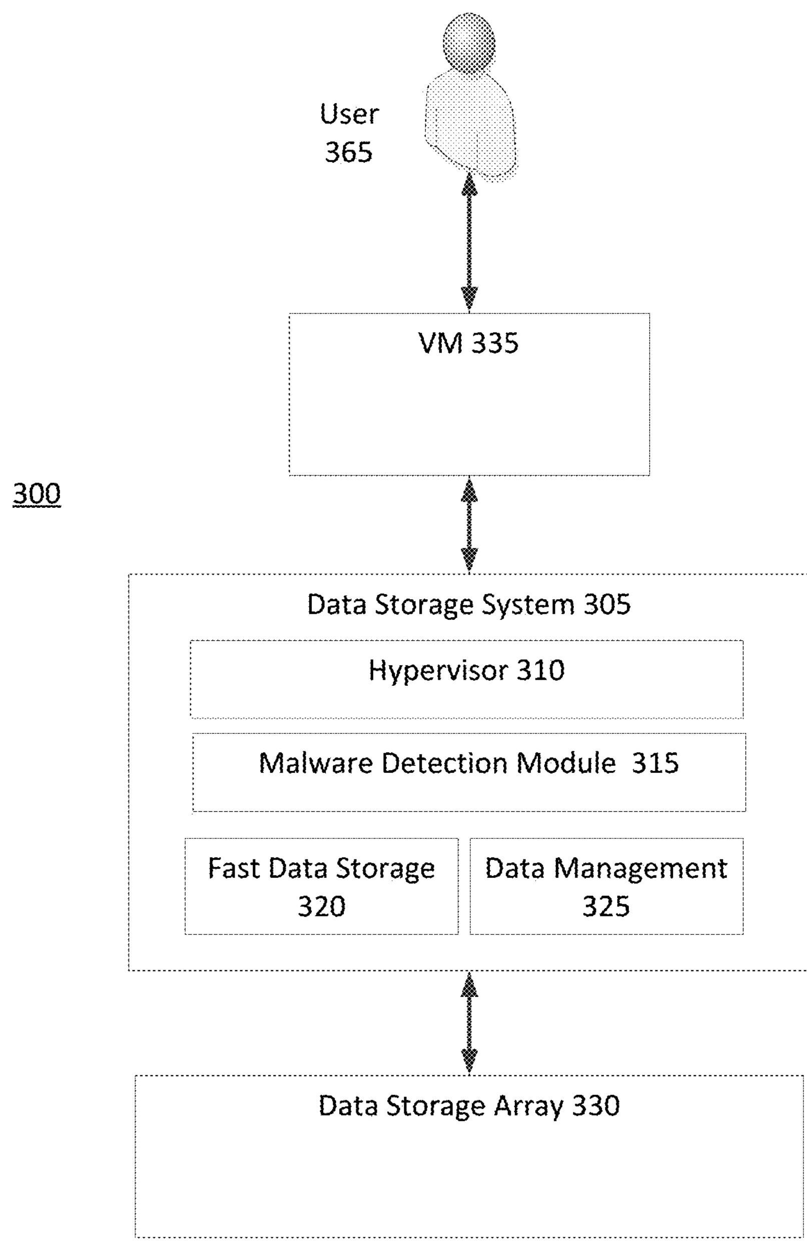
FIGS. 3A-3C are simplified illustrations of state diagrams of a data storage system protected by a malware detection module, in accordance with an embodiment of the present disclosure.
Figure 3B:
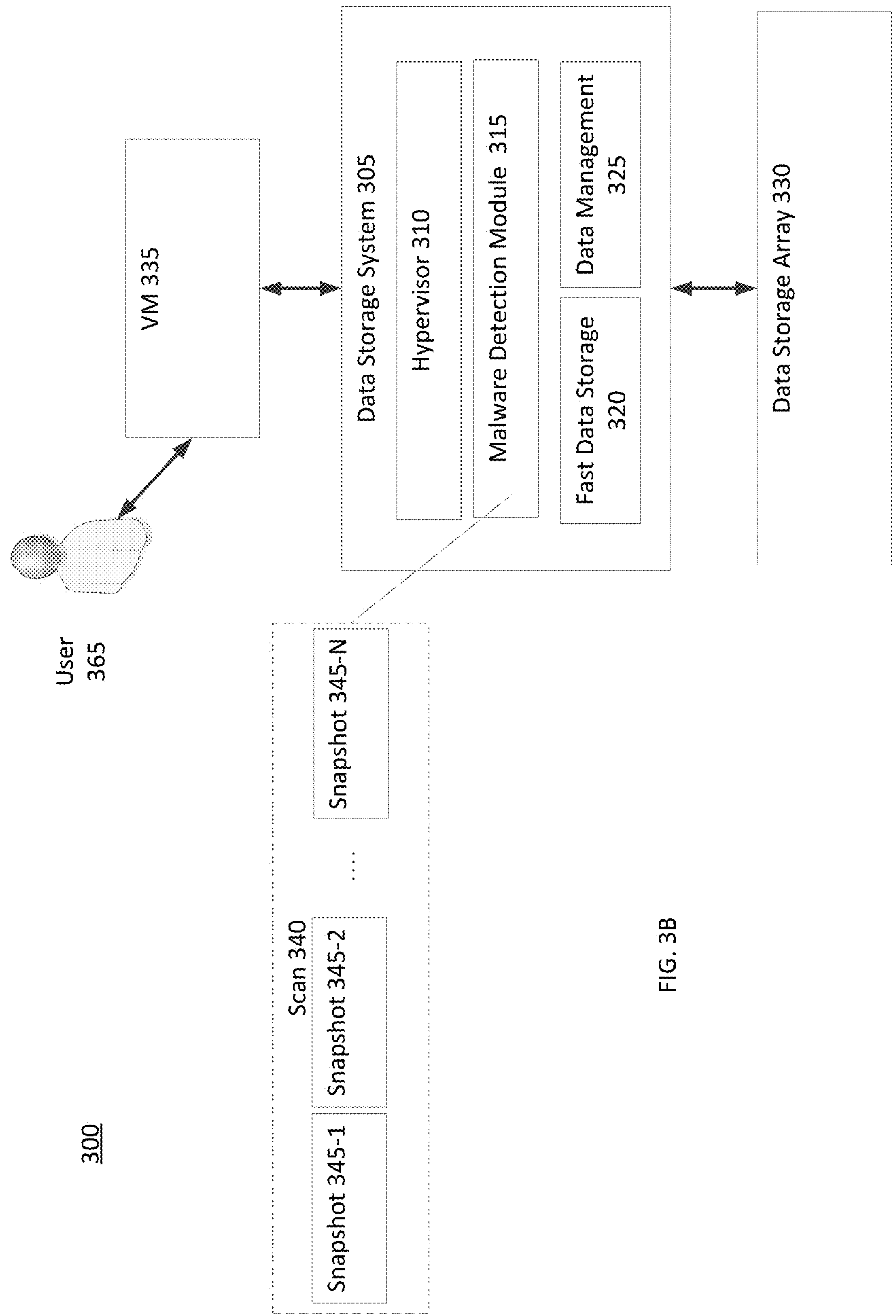
Figure 3C:
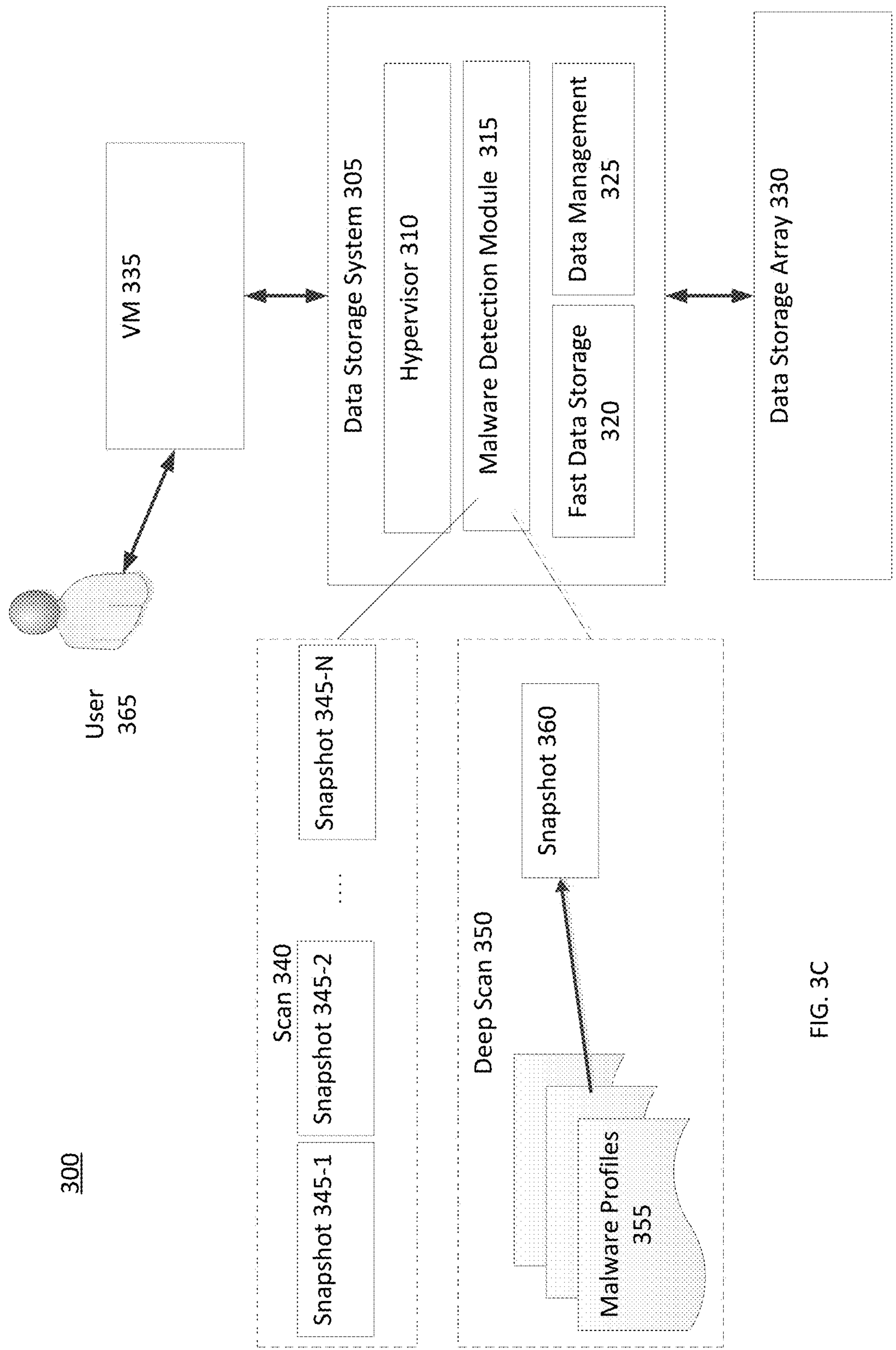

Refer to the example embodiment of FIGS. 3A-3C. FIGS. 3A-3C are simplified illustrations of state diagrams of a data storage system protected by a malware detection module, in accordance with an embodiment of the present disclosure. FIG. 3A is a simplified illustration of a first state of a data storage system, in accordance with an embodiment of the present disclosure. System 300 includes data storage system 305 and data storage array 330. Data storage system 305 is enabled to provide virtual machine (VM) 335 for User 365. Data storage utilizes data management module 325, fast data storage 320, and data storage array 330 to provide data storage for VM 335. Malware detection module 315 detects, monitors, and/or quarantines VMs running on hypervisor 310 based on analysis of snapshots.

FIG. 3B is a simplified illustration of a second state of a data storage system, in accordance with an embodiment of the present disclosure. As shown, system 300 includes data storage system 305 and data storage array 330. Data storage system 305 includes hypervisor 310, malware detection module 315, fast data storage 320, and data management module 325. In this embodiment, malware detection 315 is enabled to protect VM 335 provided using hypervisor 310 on data storage system 305. Malware detection module 315 initiates scan 340 on VM 335. During scan 340, malware detection module 315 periodically takes snapshots (345-1, 345-2, 345-N, 345 generally) of VM 335. Malware detection module 315 is enabled to analyze each of snapshots 345. In many embodiments, a malware detection module may analyze each snapshot by comparing each snapshot to one or more previous snapshots. In other embodiments, a malware detection module may analyze each snapshot by searching for malware indicative behavior, such as memory usage, port usage, unusual network connections, and other superfluous activities that may be indicative of a malware infection. In this embodiment, malware detection module 315 is enabled to determine whether VM 335 has a threshold amount of suspected malware type behavior by analyzing snapshots 345. In many embodiments, an administrator or user may be enabled to specify a threshold for malware type behavior. In various embodiments, a threshold may be determined by the amount of malware type behavior typically shown by known malware infected VMs.

FIG. 3C is a simplified illustration of a third state of a data storage system, in accordance with an embodiment of the present disclosure. As shown, system 300 includes data storage system 305 and data storage array 330. Data storage system 305 includes hypervisor 310, malware detection module 315, fast data storage 320, and data management module 325. In this embodiment, Malware detection module 315 is enabled to monitor VM 335 for malware infection. Malware detection module 315 is enabled to use a two-phase process to protect VM 335. Malware detection module 315 initially uses a scan 340 of one or more snapshots 345 of VM 335. If any of the snapshots 345 reach a threshold level of suspicious activity for malware infection, malware detection module 315 is enabled to use deep scan 350 to further process snapshots 345. As shown, during deep scan 350, malware detection module 315 compares malware profiles 355 with snapshot 360. Snapshot 360 is enabled to be one or more of snapshots 345 which have surpassed a threshold level of malware type activity. Though analysis of snapshot 360 using malware profiles 355, malware detection module 315 is enabled to determine whether a known malware and/or set of malicious code (described in malware profiles 355) has infected VM 335. Upon identifying a type of malware using malware profiles 355, malware detection module 315 is enabled to incorporate other suspicious activities detected in snapshot 360 to the associated malware in malware profiles 355.

Figure 4:
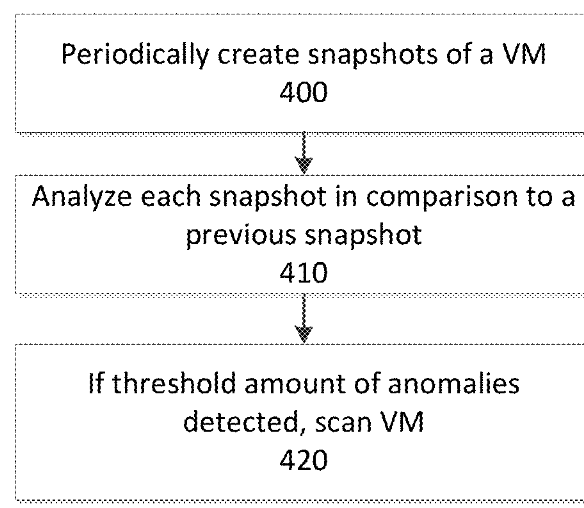
FIG. 4 is a simplified flowchart of a method of detecting malware in a system shown in FIG. 3C, in accordance with an embodiment of the present disclosure.

Refer to the example embodiment of FIG. 4. FIG. 4 is a simplified flowchart of a method of detecting malware in a system shown in FIG. 3C, in accordance with an embodiment of the present disclosure. As shown, system 300 includes data storage system 305 and data storage array 330. Data storage system 305 includes hypervisor 310, malware detection module 315, fast data storage 320, and data management module 325. Data storage system 305 provides VM 335 to user 365 using hypervisor 310. Malware detection module 315 periodically creates snapshots 345 of VM 335 (Step 400). Malware detection module 315 executes scan 340 which analyzes each of snapshot 345 by comparing each of snapshot 345 to previously created snapshots (Step 410). If malware detection module 315 determines that a threshold amount of malware anomalies exist in any of snapshots 345, malware detection module 315 executes deep scan 350 on one or more of snapshots 345 (Step 420). Deep scan 350 includes malware detection module 315 analyzing and/or comparing snapshot 360, which has achieved a minimum threshold of anomalies, with malware profiles 355.

Figure 5:
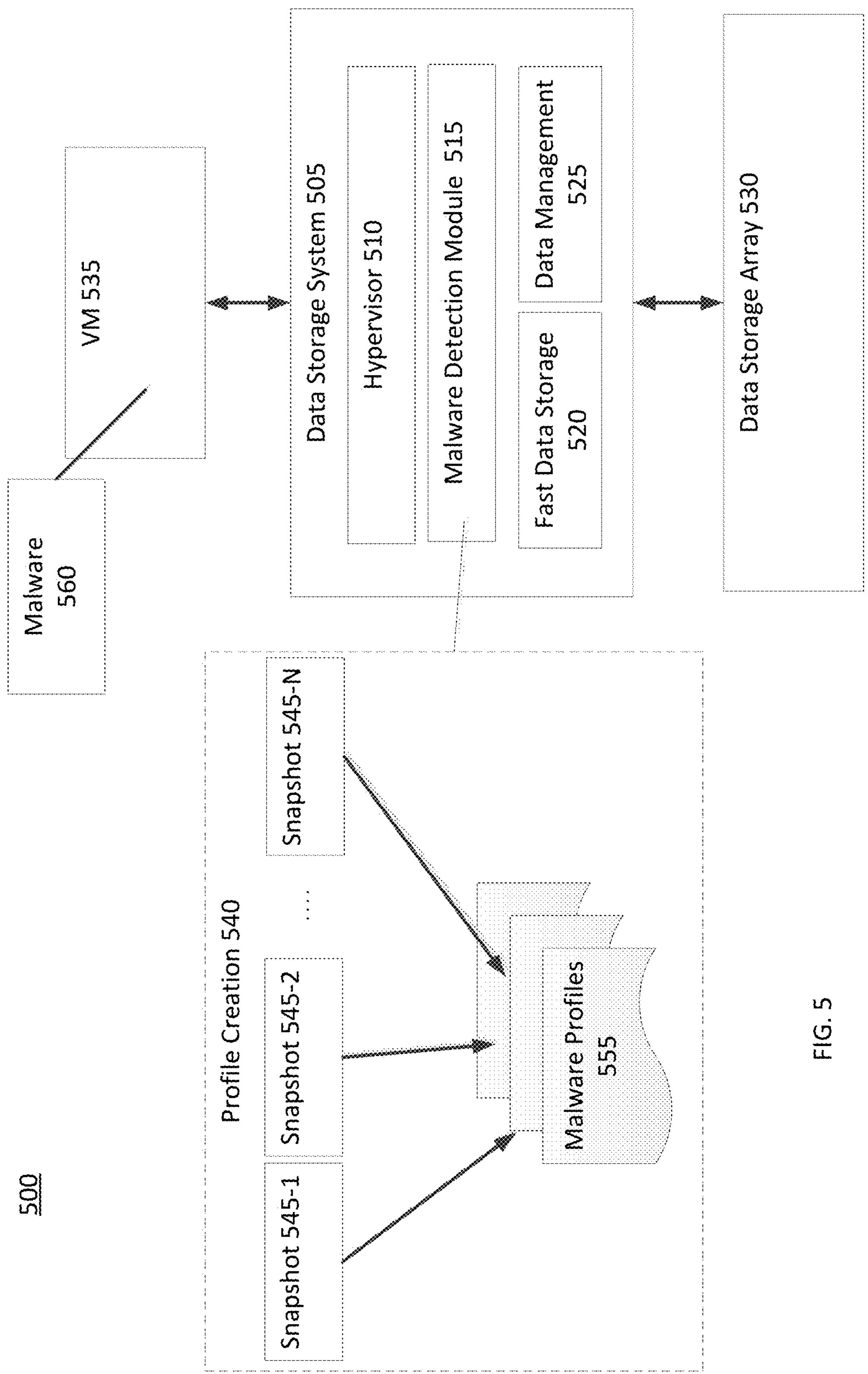
FIG. 5 is a simplified illustration of a system creating malware profiles, in accordance with an embodiment of the present disclosure.

Refer to the example embodiment of FIG. 5. FIG. 5 is a simplified illustration of a system creating malware profiles, in accordance with an embodiment of the present disclosure. As shown, system 500 includes data storage system 505 and data storage array 530. Data storage system 505 includes hypervisor 510, malware detection module 515, fast data storage 520, and data management module 525. Data storage system 505 is in communication with data storage array 530. Data storage system 505 is enabled to create VM 535. Malware detection module 515 is enabled to create malware profiles 555 using profile creation 540. Malware detection module 515 creates multiple snapshots (545-1, 545-2, 545-N, 545 generally) of VM 535. Malware detection module 515 is enabled to infect VM 535 with malware 560 to determine an effect of malware 560 on VM 535, such as, but not limited to, anomalies in memory, ports, network connections, and/or other portions of VM 535. Malware detection module 515 is enabled to create malware profiles 555 based on differences found between snapshots 545 at times when VM 535 was not infected with malware 560 and when VM 535 was infected with malware 560.

Figure 6:
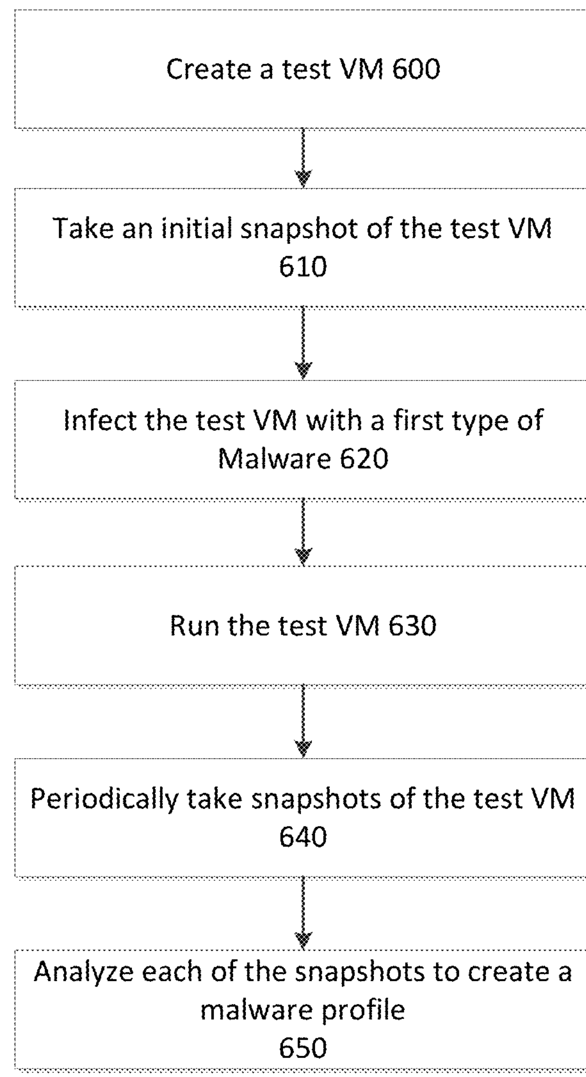
FIG. 6 is a simplified flowchart of a method of creating malware profiles using the system shown in FIG. 5, in accordance with an embodiment of the present disclosure.

Refer to the example embodiment of FIG. 6. FIG. 6 is a simplified flowchart of a method of creating malware profiles using the system shown in FIG. 5, in accordance with an embodiment of the present disclosure. As shown in FIG. 5, system 500 includes data storage system 505 and data storage array 530. Data storage system 505 creates test VM 535 (Step 600). Malware detection module 515 takes an initial snapshot 545-1 of the test VM 535 (Step 610). The test VM 535 is infected with a first type of malware (Step 620). Malware detection module allows VM 535 to run for a specified time (Step 630) and periodically takes one or more snapshots 545 of VM 535 (Step 640). Malware detection module 515 analyzes each of snapshots 545 to create malware profiles 555 (Step 650). Malware detection module 515 repeats this process with multiple known types of malware 560 to create various versions of malware profiles 555 for each known type of malware 560.

In many embodiments, a malware detection module may be included in one or more portions of a data storage system. In most embodiments, a malware detection module may reside within a data storage system where a hypervisor may be installed. In some embodiments, a malware detection module may reside within a data storage system separate from where a hypervisor may be implemented. In various embodiments, a malware detection module may be a service provided by a cloud storage provider to provide malware protection for cloud storage resources.

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 7:
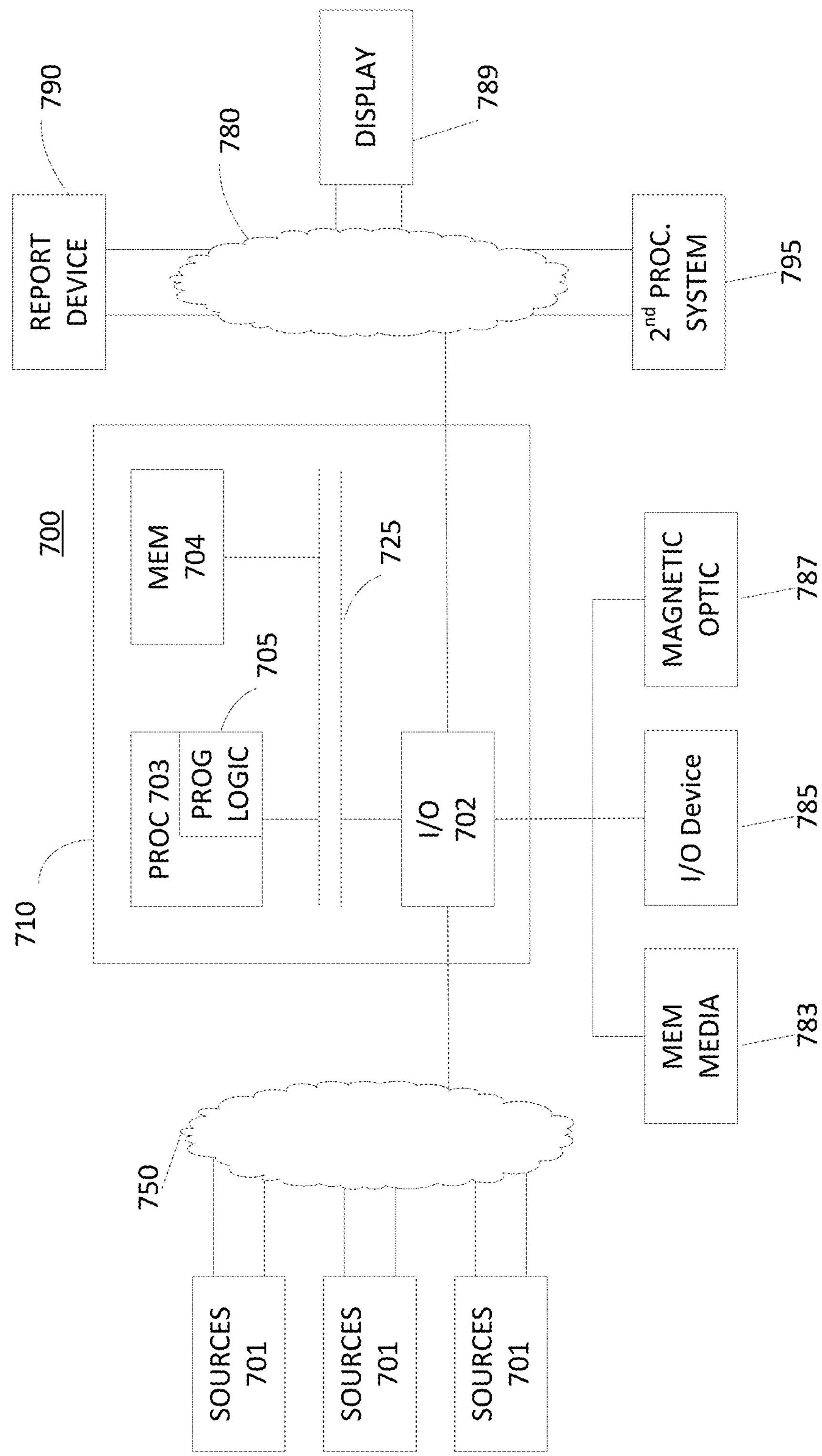
FIG. 7 is an example of an embodiment of an apparatus that may utilize the techniques described herein, in accordance with an embodiment of the present disclosure.

FIG. 7 is a block diagram illustrating an apparatus, such as a computer 710 in a network 700, which may utilize the techniques described herein according to an example embodiment of the present invention. The computer 710 may include one or more I/O ports 702, a processor 703, and memory 704, all of which may be connected by an interconnect 725, such as a bus. Processor 703 may include program logic 705. The I/O port 702 may provide connectivity to memory media 783, I/O device 785, and one or more drives 787, such as magnetic drives, optical drives, or Solid State Drives (SSD). The computer 710 is configured to communicate with a plurality of sources 701 via a network 750 using the one or more I/O ports 702. The computer 710 is further configured to communicate with a display 789, a report device 790, and a second processing system 795 via a network 780 using the one or more I/O ports 702. When the program code is loaded into memory 704 and executed by the computer 710, the machine becomes an apparatus for practicing the invention. When implemented on one or more general-purpose processors 703, the program code combines with such a processor to provide a unique apparatus that operates analogously to specific logic circuits. As such, a general purpose digital machine can be transformed into a special purpose digital machine.

Figure 8:
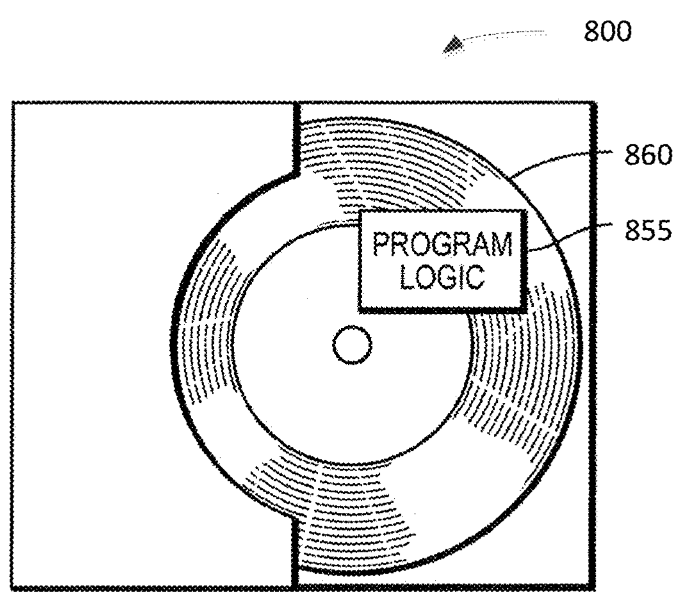
FIG. 8 is an example of a method embodied on a computer readable storage medium that may utilize the techniques described herein, in accordance with an embodiment of the present disclosure.

FIG. 8 is a block diagram illustrating a method embodied on a computer readable storage medium 860 that may utilize the techniques described herein according to an example embodiment of the present invention. FIG. 8 shows program logic 855 embodied on a computer-readable medium 860 as shown, and wherein the logic is encoded in computer-executable code configured for carrying out the methods of this invention and thereby forming a computer program product 800. Program logic 855 may be the same logic 705 on memory 704 loaded on processor 703 in FIG. 7. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-8. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of detecting malware in a virtual machine (VM), the computer-executable method comprising:

creating malware profiles by analyzing malware infected VMs to determine specified characteristics of each malware being analyzed;

periodically creating snapshots of the VM;

analyzing, by a detecting module trained using a learning algorithm, each of the snapshots in comparison to one or more previous snapshots to determine whether anomalies exist; and based on a threshold amount of anomalies detected during the snapshot analysis, scanning, by the detecting module, the VM to determine whether malware is detected;

wherein a given one of the malware profiles is created at least in part by intentionally infecting a test VM with a corresponding particular type of malware having a malicious code capable of infecting the test VM and comparing a snapshot taken of the test VM prior to the infecting of the test VM with at least one snapshot taken of the test VM subsequent to the infecting of the test VM; and wherein analyzing each of the snapshots comprises detecting an effect of the corresponding particular type of malware on the VM, the effect including anomalies in at least one of memory, a port, a network connection and a virtual disk of the VM.

2. The computer-executable method of claim 1, wherein scanning comprises comparing each of the snapshots of the VM with a profile to determine whether the VM is infected with malware.

3. The computer-executable method of claim 1, wherein creating malware profiles comprises:

creating the test VM with a similar profile to the VM;

taking a first snapshot of the test VM;

intentionally infecting the test VM with a first type of malware having a malicious code capable of infecting the test VM;

running the test VM while periodically taking subsequent snapshots of the test VM; and analyzing each of the subsequent snapshots of the test VM in comparison with the first snapshot to determine an effect of the first type of malware on the test VM.

4. The computer-executable method of claim 1, wherein the malware profiles indicate changes in the VM that are indicative of a type of malware.

5. The computer-executable method of claim 1, further comprising creating a first snapshot of the VM, wherein each of the subsequent snapshots is compared with the first snapshot of the VM.

6. The computer-executable method of claim 1, wherein analyzing each of the snapshots comprises at least one of the following:

analyzing a virtual disk associated with the VM; and analyzing memory of the VM.

7. A system, comprising:

a data storage system enabled to provide a virtual machine (VM); and computer-executable program logic encoded in memory of one or more computers enabled to detect malware in the VM, wherein the computer-executable program logic is configured for the execution of:

creating malware profiles by analyzing malware infected VMs to determine specified characteristics of each malware being analyzed;

periodically creating snapshots of the VM;

analyzing, by a detecting module trained using a learning algorithm, each of the snapshots in comparison to one or more previous snapshots to determine whether anomalies exist; and based on a threshold amount of anomalies detected during the snapshot analysis, scanning, by the detecting module, the VM to determine whether malware is detected;

wherein a given one of the malware profiles is created at least in part by intentionally infecting a test VM with a corresponding particular type of malware having a malicious code capable of infecting the test VM and comparing a snapshot taken of the test VM prior to the infecting of the test VM with at least one snapshot taken of the test VM subsequent to the infecting of the test VM; and wherein analyzing each of the snapshots comprises detecting an effect of the corresponding particular type of malware on the VM, the effect including anomalies in at least one of memory, a port, a network connection and a virtual disk of the VM.

8. The system of claim 7, wherein scanning comprises comparing each of the snapshots of the VM with a profile to determine whether the VM is infected with malware.

9. The system of claim 7, wherein creating malware profiles comprises:

creating the test VM with a similar profile to the VM;

taking a first snapshot of the test VM;

intentionally infecting the test VM with a first type of malware having a malicious code capable of infecting the test VM;

running the test VM while periodically taking subsequent snapshots of the test VM; and analyzing each of the subsequent snapshots of the test VM in comparison with the first snapshot to determine an effect of the first type of malware on the test VM.

10. The system of claim 7, wherein the malware profiles indicate changes in the VM that are indicative of a type of malware.

11. The system of claim 7, wherein the computer-executable program logic is further configured for the execution of creating a first snapshot of the VM, wherein each of the subsequent snapshots are compared with the first snapshot of the VM.

12. The system of claim 7, wherein analyzing each of the snapshots comprises at least one of the following:

analyzing a virtual disk associated with the VM; and analyzing memory of the VM.

13. A computer program product for detecting malware in a virtual machine (VM), the computer program product comprising:

a non-transitory computer readable medium encoded with computer-executable code, the code configured to enable the execution of:

creating malware profiles by analyzing malware infected VMs to determine specified characteristics of each malware being analyzed;

periodically creating snapshots of the VM;

analyzing, by a detecting module trained using a learning algorithm, each of the snapshots in comparison to one or more previous snapshots to determine whether anomalies exist; and based on a threshold amount of anomalies detected during the snapshot analysis, scanning, by the detecting module, the VM to determine whether malware is detected;

wherein a given one of the malware profiles is created at least in part by intentionally infecting a test VM with a corresponding particular type of malware having a malicious code capable of infecting the test VM and comparing a snapshot taken of the test VM prior to the infecting of the test VM with at least one snapshot taken of the test VM subsequent to the infecting of the test VM; and wherein analyzing each of the snapshots comprises detecting an effect of the corresponding particular type of malware on the VM, the effect including anomalies in at least one of memory, a port, a network connection and a virtual disk of the VM.

14. The computer program product of claim 13, wherein scanning comprises comparing each of the snapshots of the VM with a profile to determine whether the VM is infected with malware.

15. The computer program product of claim 13, wherein creating malware profiles comprises:

creating the test VM with a similar profile to the VM;

taking a first snapshot of the test VM;

intentionally infecting the test VM with a first type of malware having a malicious code capable of infecting the test VM;

running the test VM while periodically taking subsequent snapshots of the test VM; and analyzing each of the subsequent snapshots of the test VM in comparison with the first snapshot to determine an effect of the first type of malware on the test VM.

16. The computer-executable method of claim 1, including intentionally infecting the test VM with multiple known types of malware, and further including creating, with the detecting module, various versions of malware profiles for each known type of malware.

17. The system of claim 7, including intentionally infecting the test VM with multiple known types of malware, and further including creating, with the detecting module, various versions of malware profiles for each known type of malware.

18. The computer program product of claim 13, including intentionally infecting the test VM with multiple known types of malware, and further including creating, with the detecting module, various versions of malware profiles for each known type of malware.

19. The computer program product of claim 13, further comprising creating a first snapshot of the VM, wherein each of the subsequent snapshots is compared with the first snapshot of the VM.

20. The computer program product of claim 13, wherein analyzing each of the snapshots comprises at least one of the following:

analyzing a virtual disk associated with the VM; and analyzing memory of the VM.

* * * * *